United States Patent [19]

Schmidt

[11] 3,958,554

[45] May 25, 1976

[54] SOLAR COLLECTOR HAVING OXYGEN-DEFICIENT PbO₂ COATING

[75] Inventor: Ferenc J. Schmidt, Ardmore, Pa.

[73] Assignee: Ametek, Inc., New York, N.Y.

[22] Filed: July 2, 1974

[21] Appl. No.: 485,246

[52] U.S. Cl............................. 126/271; 29/180 R; 357/10
[51] Int. Cl.².................... F24J 3/02; F28F 21/00
[58] Field of Search................. 126/270, 271, 400; 237/1 A; 29/180 R

[56] References Cited
UNITED STATES PATENTS

| | | | |
|---|---|---|---|
| 2,917,817 | 12/1959 | Tabor | 29/180 R |
| 3,174,537 | 3/1965 | Meyer | 126/270 X |
| 3,176,678 | 4/1965 | Langley | 126/270 |
| 3,272,986 | 9/1966 | Schmidt | 126/270 X |
| 3,841,302 | 10/1974 | Falbel | 126/271 X |

OTHER PUBLICATIONS

Electrical Properties of electodeposited PbO₂ Films, W. Mindt Journal Electrochemical Society, Vol. 116, No. 8, pp. 1076–1080, Aug. 1969,

*Primary Examiner*—L. Dewayne Rutledge
*Assistant Examiner*—Arthur J. Steiner
*Attorney, Agent, or Firm*—Smythe & Moore

[57] ABSTRACT

A solar heat collector including a panel coated with oxygen-deficient $PbO_2$, such as $\alpha$-$PbO_2$ or $\beta$-$PbO_2$, heat being absorbable thereby and transferable to a liquid for operation heating or cooling systems.

8 Claims, 1 Drawing Figure

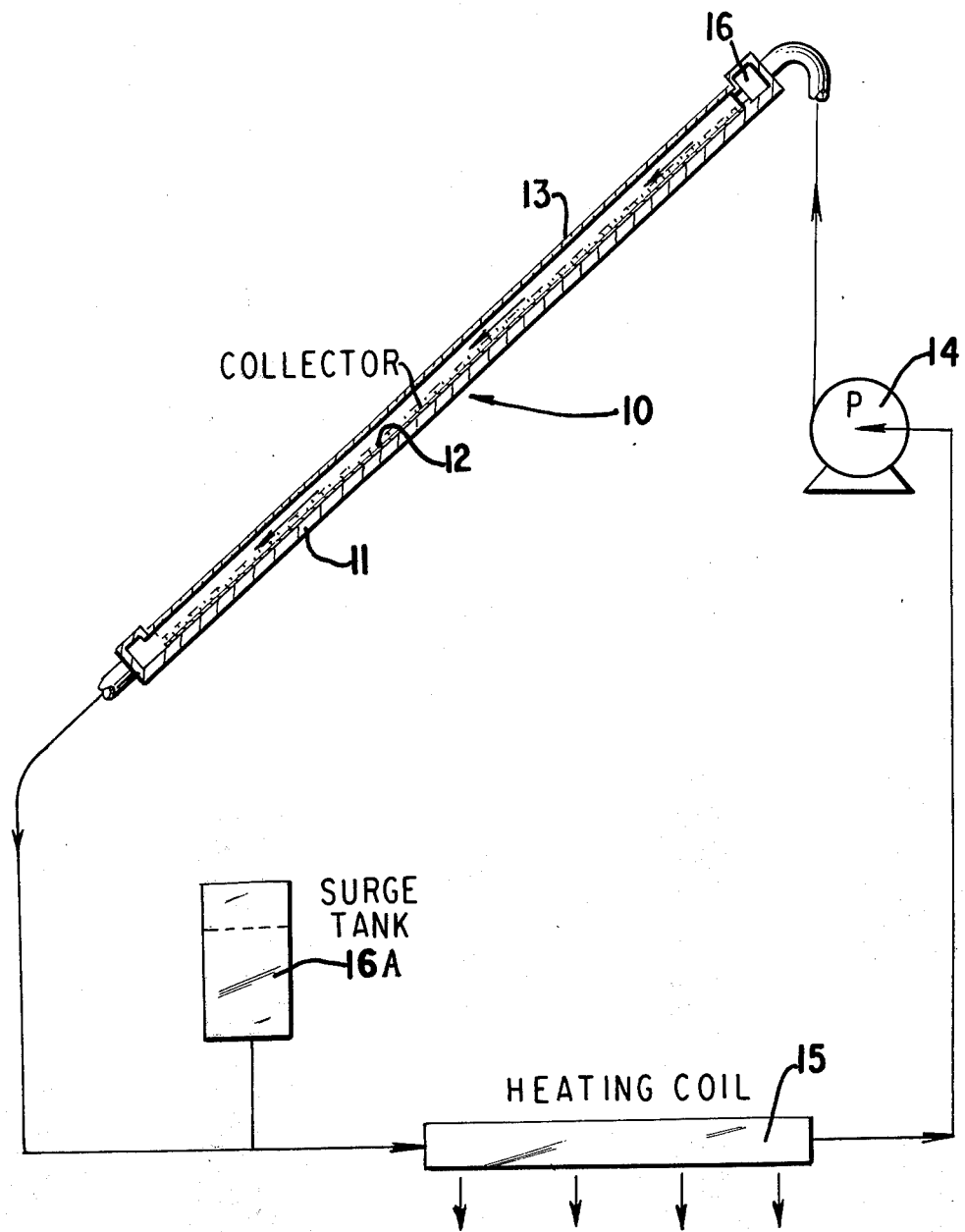

SOLAR COLLECTOR HAVING OXYGEN-DEFICIENT PbO₂ COATING

This invention relates to solar heat collectors and particularly to a coating for improving solar heat collection.

The heating and cooling of houses by use of solar energy is well known, examples thereof being shown in U.S. Pat. Nos. 3,145,707; 3,215,134; 3,295,591; and 3,236,294. About one-fifth of the fuel consumed in the United States is used for heating and cooling of buildings so that it would be desirable to use solar energy instead of energy derived from fossil or nuclear fuel sources. Present devices are not efficient and require large expanses of collector surface area to operate. As a result, known collectors and equipment are expensive because of the required size with resultant high investment. Prior less costly low temperature (approximately 220° F.) installations use flat plate collectors, and the more expensive type (above 400° F.) use concentrators before collection of the energy. The collectors involve a tube or panel which absorbs the incident solar radiation and heats a fluid circulating thereby.

One of the objects of the invention is to provide an improved heat collector for solar energy devices.

In one aspect of the invention, a solar heat collector has a solar energy collecting surface which is coated with an oxygen-deficient $PbO_2$, such as $\alpha$-$PbO_2$ or $\beta$-$PbO_2$. Such can be a flat or corrugated panel or can be in the form of tubes.

Other objects, advantages and features of the invention will become apparent from the following description and drawings which are merely exemplary.

In the drawing, the FIGURE schematically shows a solar energy collector and system, the collector being in section.

As schematically shown in the drawing, solar collector 10 may comprise a collector plate 11 having a coating 12, to be described hereafter, thereon. The collector can have a transparent glass or other material cover 13 thereon. The fluid to be heated for use in the heating or cooling system is pumped by pump 14 from the heating or heat transfer coil 15 to the header 16 where it is distributed over plate 11 and then returned to the heating coil 15. A surge tank 16A can be included. The particular system can take various forms, such as seen in some of the aforementioned patents.

The "black" coating of the panel is of the most importance inasmuch as it determines the two most important parameters of the collector.

The solar absorptivity, or $\alpha$ value, should be as high as possible, the limit thereof being that of a theoretical black body or 100 percent. The $\alpha$ is measured at the solar spectrum which peaks at 0.5 micron wave length.

The emissivity, or $\epsilon$ value, is the reradiated heat loss which should be as low as possible. $\epsilon$ is measured at the collector temperature or for 220° F. at around 8 microns wave length.

According to the Stefan-Boltzmann law, $\epsilon$ increases with temperature until an equilibrium temperature is reached where the reradiated energy equals the absorbed solar energy.

The equilibrium temperatures corresponding to various $\alpha/\epsilon$ ratios, $\alpha/\epsilon$ being surface properties, are shown in the following table.

TABLE I

| Equilibrium temperatures of flat plates (approximate values) | |
|---|---|
| $\alpha/\epsilon$ | °F |
| 6.0 | 470 |
| 5.0 | 430 |
| 2.0 | 250 |
| 1.0 | 135 |
| 0.5 | 40 |
| 0.2 | −60 |

Typical $\alpha/\epsilon$ representation values for groups of materials are shown in the following table.

TABLE II

| | $\alpha$ | $\epsilon$ | $\alpha/\epsilon$ |
|---|---|---|---|
| Al, freshly evap. | .10 | .025 | 4 |
| Au | .16 | .02 | 8 |
| Ag | .07 | .01 | 7 |
| Ta | .59 | .02 | 29 |
| $Al_2O_3$ | .16 | .75 | .21 |
| Lampblack | .99 | .97 | 1 |
| White paint 1 mil. | .15 | .94 | .16 |
| Black paint, 1 mil. | .97 | .94 | 1.03 |
| Clear varnish on Al 1 mil. | .20 | .80 | .25 |
| Clear varnish on Al .24 mil. | .20 | .10 | 2.0 |

It was ascertained that by using a coating of $\beta$-$PbO_{1.98}$ on the collector plate, that an unobvious result of decidedly improved solar collection result was reached. The coating is infrared transparent, i.e., has a low $\epsilon$, and is dark gray in the solar or visible range. The $\alpha$ was measured to be about 90 percent, and the $\epsilon$ about 0.15 and the ratio of $\alpha/\epsilon$ to be 6. Such is very much in contrast to the values for other substances shown in the preceding tables. It is seen therein that some material, such as bare metals, have good $\alpha/\epsilon$ ratios, but the absolute value for $\alpha$ is low so that most of the incident energy is reflected (1−$\alpha$) and only a small portion (the $\alpha$) is absorbed which results in a very low efficiency. Black paints or organic coatings in general have high $\alpha$ values but the ratio $\alpha/\epsilon$ is not much above the unity so that they remain cool.

The collector surface can be plated by electrodeposition to obtain a semiconductor-type $PbO_2$. At a $O_2/Pb$ ratio of 1.98, the coating is an oxygen-deficient, n-type metal oxide with high electron mobility which is several orders higher than for other oxides of this type, e.g., $ZnO$, $In_2O_3$ or $SnO_2$.

One manner of applying the aforementioned $\beta$-$PbO_{1.98}$ coating is as follows:

Plating bath composition: 0.6 mol/liter (or 200 g/lit) of lead nitrate, obtained by dissolving 135 g lead monoxide in 79 cc of nitric acid, s.g. 1415, water was added to bring volume to 1 liter, and 1.5 gr wetting agent (Tergitol, nonionic) and 5 gr copper nitrate (later is used to plate out on the cathode, instead of lead, to conserve the lead in the bath.) "Tergitol" is the trademark of Union Carbide Corp. for its brand of surface active agents. Beta-lead dioxide deposited on the anode under the following strict conditions:

pH = 1 (range 0.5 to a maximum of 2)
Temperature — 75° C. (range 60° to boiling)
Copper plate cathodes were used. The workpiece was the anode.

Agitation

Current density (critical, 10–20 amps/sq. foot on the anode.) Above 20 asf. the stresses crack up the coating. Below 10 asf. there was no uniform plating. Optimum C.D. was 17 asf. The thickness inch. the coating after twenty minutes was 0.0003 inch, Other oxygen-deficient lead dioxides or semiconductor-type lead dioxides can be used.

As a further example, an $\alpha$-$PbO_{1.94}$ coating was obtained by applying a coating as follows:

Plating bath composition: NaOH 50 g/lit, lead monoxide 50 g/lit, water added to bring the volume to 1 liter, 41.5 g/lit wetting agent, such as Tergitol nonionic.

$\alpha$-$PbO_{1.94}$ deposited on the anode under the following conditions:

pH = 13.5
Room temperature
Copper plate cathodes
Workpiece was the anode
Vigorous agitation
Anode current density 10 amps/sq. foot The thickness of the coating after twenty minutes was 0.0003 inch.

It was further found that the infrared absorption within the oxygen-deficient $PbO_2$ film was further decreased by decreasing the thickness of the film. For example, by applying 0.00003 inch coating, the $\alpha/\epsilon$ ratio increased to 11.

The oxygen-deficient $PbO_2$ can be obtained in the ranges of $PbO_{1.66}$ to $PbO_{1.99}$, such as recognized in the paper "Electrical Properties of Electrodeposited $PbO_2$ Films" by W. Mindt, Journal Electro-Chemical Society, Vol. 116, No. 8, Pp. 1076–1080.

The bath composition to obtain oxygen-deficient $PbO_2$ can be varied, such as mentioned in U.S. Pat. Nos. 2,846,378; 2,872,405; 2,945,790; 2,945,791; 3,213,004; 3,463,707 and 3,634,216. As an example, a highly acidic bath in the foregoing example can not be used for plating on copper and a highly alkali bath of the other example can not be used on aluminum because of attack on the substrates.

Oxygen-deficient $PbO_2$ shares the high infrared transmittancy coupled with high absorbtivity with some other semiconductor materials, such appended semiconductor silicon which has a high infrared transmittancy and, therefore, has a low $\epsilon$ and an $\alpha/\epsilon$ of about 9 at 0.00003 inch thickness. Silicon coatings can be obtained on aluminum by etching away the aluminum matrix in a silicon-containing aluminum alloy which exposes the silicon particles on the surface which appear as a (dark gray) smut.

It should be apprent that details of the process and coating can be varied except as defined in the appeneded claims.

I claim:

1. A solar energy collector system comprising a heat transfer member, a surface coating of oxygen-deficient $PbO_2$ on said member, means feeding fluid into heat transfer relation to said member, and means for feeding fluid from said member to a zone of utilization.

2. A solar energy collector system as claimed in claim 1 wherein the oxygen-deficient $PbO_2$ is in the range of $PbO_{1.66}$ and $PbO_{1.99}$.

3. A solar energy collector system as claimed in claim 1 wherein the $PbO_2$ is of the semiconductor type.

4. A solar energy collector system as claimed in claim 1 wherein the $PbO_2$ is $\alpha$-$PbO_2$.

5. A solar energy collector system as claimed in claim 1 wherein the $PbO_2$ is $\beta$-$PbO_2$.

6. A solar energy collector system comprising a heat transfer member, a surface coating of semiconductor material having a high $\alpha$ and low $\epsilon$ on said member, means feeding fluid into heat transfer relation to said member, and means for feeding fluid from said member to a zone of utilization.

7. A solar energy system collector as claimed in claim 6 wherein the $\alpha$ is more than 90 percent and the $\epsilon$ is less than 15 percent.

8. A solar energy collector system as claimed in claim 6 wherein the semiconductor material is semiconductor silicon.

* * * * *

UNITED STATES PATENT OFFICE
CERTIFICATE OF CORRECTION

PATENT NO. : 3,958,554
DATED : May 25, 1976
INVENTOR(S) : Ferenc J. Schmidt

It is certified that error appears in the above-identified patent and that said Letters Patent are hereby corrected as shown below:

Patent front page, [57], Abstract, line 4, "operation" should be --operating--. Column 2, line 23, after "White paint" insert a comma (,). Column 3, line 6, "inch." should be --of the--; Column 3, line 7, after "inch" the comma (,) should be a period (.). Column 4, line 3, "appended" should be --as--; Column 4, lines 12-13, "appeneded" should be --appended--; Column 4, line 36, delete "system" before "collector" and insert --system-- after "collector".

Signed and Sealed this

Third Day of August 1976

[SEAL]

*Attest:*

RUTH C. MASON
*Attesting Officer*

C. MARSHALL DANN
*Commissioner of Patents and Trademarks*